United States Patent [19]
Ward

[11] 3,798,815
[45] Mar. 26, 1974

[54] RETAINING DEVICE FOR PICTURE FRAMES

[76] Inventor: Richard H. Ward, 1374 E. Valley Rd., Santa Barbara, Calif. 93108

[22] Filed: Oct. 10, 1972

[21] Appl. No.: 296,278

[52] U.S. Cl. ............................................. 40/156
[51] Int. Cl. ............................................. G09f 1/12
[58] Field of Search ....... 40/152, 156; 248/488, 490

[56] References Cited
UNITED STATES PATENTS
2,184,893   12/1939   Lumley .............................. 248/488
2,281,054   4/1942   Smith et al .......................... 40/156
3,349,443   10/1967   Sury ................................... 248/490
3,541,714   11/1970   Bruck, Jr. ........................... 40/156

*Primary Examiner*—Robert W. Michell
*Assistant Examiner*—Wenceslao J. Contreras
*Attorney, Agent, or Firm*—Evert A. Autrey

[57]   ABSTRACT

A retaining device for holding a moulding framework, artwork, and a transparent facing material in a picture frame assembly.

2 Claims, 6 Drawing Figures

PATENTED MAR 26 1974 3,798,815
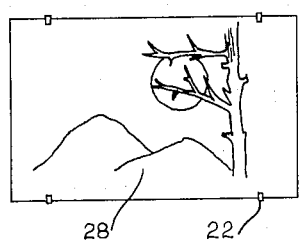
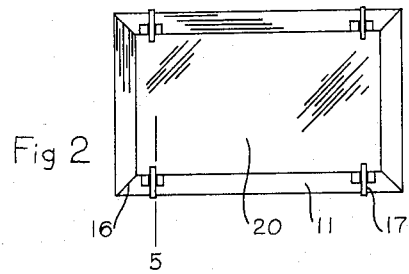
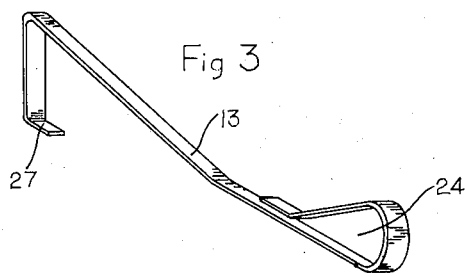
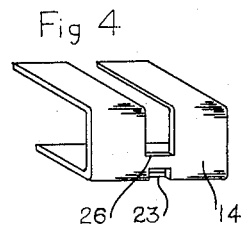
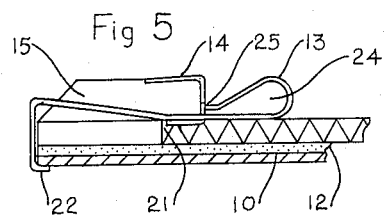
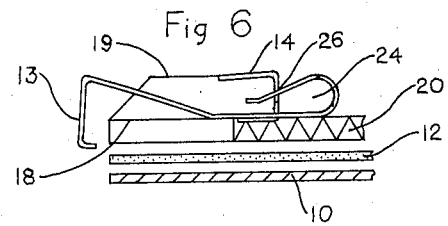
INVENTOR
RICHARD H. WARD

RETAINING DEVICE FOR PICTURE FRAMES

SUMMARY OF THE INVENTION

The intention of the retaining device and associated moulding is to provide a method by which art work which has been rendered on flat paper or art board can be placed between a rigid moulding framework in the rear and a rigid transparent facing material towards the front. Although the thickness of these materials may vary, the length and width of each is equal or superimposed. The moulding and retaining device are of specific design and have related functions. The moulding, which forms the basic structure, accepts the retaining device and the function of the retaining device is to hold the facing material against the moulding structure. In this position the materials are sandwiched together and under a spring tension which is applied by the retaining device. The retaining device is comprised of two parts, one part which may or may not be permanently attached to the moulding provides a stationary base from which the second piece, made of a resilient material, performs its function, that of applying needed tension between the moulding framework and the transparent facing material. The ability of this tension to be relieved and the piece removed from the facing material to allow removal of the art piece which was held between the moulding frame and the facing material by this same tension is provided by the retaining device.

In general, a conventional picture frame is constructed from a wood moulding. When a transparent facing material is required it is inserted from the rear of the moulding framework into a rabbet which is provided for the purpose of accepting the transparent facing material and the art work which follows the transparent facing material from the rear. To the rear of the art work is placed, and permanently attached, backing material which supports the art work between this backing material and the transparent facing material. This combination means a picture frame always has a border of moulding visible from the front of the picture as viewed. A further intention of the retaining device and associated moulding herein disclosed is to provide a method of picture frame construction which encompasses established methods by which picture framers construct picture frames, but has as a final product a picture frame which has a minimized border. The design of the retaining device and associated moulding herein disclosed allows the facing material, the art work, and the moulding framework, to be of equal dimensions when viewed from the front. Since the moulding framework and facing material are of equal dimensions, it is necessary to provide a retaining device which will hold these members in a stationary condition, and this is the function of the retaining device. A picture frame constructed using this retaining device and associated moulding herein disclosed produces a picture frame where when viewed from the front has no visible border, yet has a basic structure composed of a moulding framework which can be constructed using conventional methods.

DESCRIPTION OF THE DRAWING

FIG. 1 is a frontal view of a typical picture frame unit embodying the invention.

FIG. 2 is a rear view showing the moulding at the perimeter with the four retaining devices in place in the moulding and the moulding insert which forms the central area.

FIG. 3 is a perspective view of the resilient part of the retaining device which provides the spring tension between the moulding framework and the facing material and acts as the member which holds said members together.

FIG. 4 is a perspective view of the stationary base of the retaining device. This part may or may not be of resilient material.

FIG. 5 is a cross-sectional view, as indicated in FIG. 2, which illustrates the physical relationship between the retaining device and associated moulding with the retaining device in its locked position and providing spring tension between the moulding framework and the facing material.

FIG. 6 is a cross-sectional view similar to that in FIG. 5 except the resilient part of the retainer is in its unlocked position where the spring tension is not being applied.

DETAILED DESCRIPTION OF THE DRAWING

Referring to the drawings, the retaining device and associated moulding 15 in its illustrated embodiment includes a moulding framework 11 structure fabricated of wood, plastic, or other workable material, which forms the basic frame structure 11, and a facing material 10 of glass, transparent sheet acrylic, or other transparent material.

The mitred angles 16 which form the moulding frame corners are made using tools or machinery which form 45° angles. The joining of the four corners 16 is accomplished by gluing and nailing or screwing while adjoining sides are held rigid in a mitre vise.

Kerfs 17 are provided at four points in the moulding 15 where it is desirable to place retaining devices. The depth 18 of the kerf 17 is exactly equal to the distance from the rearmost part 19 of the moulding 15, the point farthest away from the facing material 10, to that level 18 where the stationary part 14 of the retainer and the resilient part 13 of the retainer meet and form together the spring tension.

From the front of the moulding frame 11 is installed a filler material 20, such as a corrugated paper product, used as a backing material in the central area of the frame. A rabbet 21 is provided for this purpose at the inner edge of the moulding just below the point where the stationary part 14 of the retainer rests. This filler material 20 provides a flat surface over which the art work 12 and facing material 10 can be placed. The filler 20 also acts as a support material for the art work 12.

The facing material 10 is formed having a length and width which is identical to the corresponding dimensions of the moulding frame 11. The moulding frame 11, the art piece 12, and the facing material 10 are then placed in a stacked relation to each other and ultimately held together by the tension provided by the retainer.

The retaining device is designed to provide tension between the moulding framework 11 and the facing material 10 and also to allow a variable thickness to be placed between them. The retainer is composed of two pieces. A resilient piece 13, which hooks around the edge 22 of the facing material 10, extends along the side of the facing material 10 and a portion of the moulding 15. At a point in the side of the moulding 15 the resilient piece 13 enters the kerf 17 which has been provided for the functioning of the resilient piece 13. At the inner edge of the moulding 15, the resilient piece 13 enters the small hole 23 in the stationary piece 14 of the retainer. After passing through the small hole 23 a loop 24 is formed in the resilient piece 13. The end of the loop 24, due to its relative position, acts as a stopping surface 25 as it meets the stationary piece 14 of the retainer. To release the resilient piece 13 from its locked position the looped portion 24 of the piece 13 is expanded until the opening portion of the loop 24 will pass over the shoulder 26 of the stationary piece 14 when it is slid forward or towards the outer edge of the moulding frame 11. As the loop end 24 passes over the shoulder 26, the hooked portion 27 of the resilient part 13 will pass beyond the facing material 10 leaving it free from contact with the resilient piece 13 of the retainer. To return the resilient part 13 to its secured position, the hook end 27 is depressed beyond the facing material 10 and then the entire piece 13 is slid towards the inside edge of the moulding frame 11 until the looped end 24 has passed over the shoulder 26 of the stationary piece 14 and is behind the flat surface 25. This is a stationary condition for the resilient piece 13.

The completed picture frame 28 including the moulding frame 11, the corrugated insert 20, the art piece 12, the facing material 10, and the retaining devices can be hung from a vertical wall on a hook or nail protruding from the wall by the use of a saw-tooth hanger which is attached to the top moulding member or by hook eyes and picture wire. The hook eyes are secured to the side moulding members and the wire is attached to the hook eyes and suspended between them.

Obviously many modifications and variations of the present invention are possible in the light of the above teachings. It is therefore to be understood that within the scope of the appended claims the invention may be practiced otherwise than as specifically described.

What is claimed is:

1. In a picture frame having a moulding and a transparent facing material, the improvement comprising:
   a. a generally U-shaped stationary part adapted to hook around an edge of said moulding and defining a small hole and a stopping shoulder, and
   b. a resilient part slidably mounted in said small hole to form in combination with said stationary part a retaining device and defining a hooked end adapted to engage said transparent facing material and a looped end adapted to engage said shoulder of said stationary part as a stopping surface.

2. The invention of claim 1 comprising in addition kerfs defined by said moulding for limiting movement of said resilient part and said stationary part.

* * * * *